United States Patent
Cao et al.

(10) Patent No.: US 9,643,852 B2
(45) Date of Patent: May 9, 2017

(54) SEEDED SYNTHESIS OF ALUMINOSILICATE MOLECULAR SIEVES

(71) Applicant: EXXONMOBIL RESEARCH AND ENGINEERING COMPANY, Annandale, NJ (US)

(72) Inventors: Guang Cao, Princeton, NJ (US); Matu J. Shah, Hackettstown, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 14/437,853

(22) PCT Filed: Oct. 29, 2013

(86) PCT No.: PCT/US2013/067207
§ 371 (c)(1),
(2) Date: Apr. 23, 2015

(87) PCT Pub. No.: WO2014/092870
PCT Pub. Date: Jun. 19, 2014

(65) Prior Publication Data
US 2015/0291436 A1 Oct. 15, 2015

Related U.S. Application Data

(60) Provisional application No. 61/735,152, filed on Dec. 10, 2012.

(51) Int. Cl.
*C01B 39/04* (2006.01)
*C01B 39/02* (2006.01)
*C01B 39/48* (2006.01)
*B01J 29/70* (2006.01)
*B01J 29/85* (2006.01)

(52) U.S. Cl.
CPC .............. *C01B 39/04* (2013.01); *B01J 29/70* (2013.01); *B01J 29/7015* (2013.01); *B01J 29/85* (2013.01); *C01B 39/02* (2013.01); *C01B 39/48* (2013.01)

(58) Field of Classification Search
None
See application file for complete search history.

(56) References Cited

U.S. PATENT DOCUMENTS

| 6,342,200 | B1 | 1/2002 | Rouleau et al. |
| 6,773,694 | B1 | 8/2004 | Lesch et al. |
| 6,793,901 | B2* | 9/2004 | Cao ................... B01J 29/83 |
| | | | 423/305 |
| 6,821,503 | B1 | 11/2004 | Verduijn et al. |
| 6,974,889 | B1 | 12/2005 | Verduijn et al. |
| 7,067,108 | B2 | 6/2006 | Mertens et al. |
| 7,112,316 | B1 | 9/2006 | Konrad et al. |
| 7,264,789 | B1 | 9/2007 | Verduijn et al. |
| 7,772,335 | B1 | 8/2010 | Cao et al. |
| 2001/0020416 | A1* | 9/2001 | Yoshikawa .............. H01G 9/12 |
| | | | 95/45 |
| 2002/0170848 | A1* | 11/2002 | Mohr .................. B01J 29/06 |
| | | | 208/118 |
| 2006/0127296 | A1* | 6/2006 | Mertens ............... B01J 29/005 |
| | | | 423/306 |
| 2010/0087610 | A1* | 4/2010 | Vaughn .................. B01J 29/85 |
| | | | 526/226 |

FOREIGN PATENT DOCUMENTS

| CN | 101081370 A | 12/2007 |
| CN | 100531909 | 8/2009 |
| CN | 101711992 | 5/2012 |
| EP | 0753484 A1 | 1/1997 |
| EP | 0753485 A1 | 1/1997 |
| GB | 1060224 A | 3/1967 |
| KR | 100888467 B1 | 3/2009 |
| KR | 100891001 B1 | 3/2009 |
| WO | 2013068976 A1 | 5/2013 |

OTHER PUBLICATIONS

Zhang, et al., "Direct synthesis and methanol conversion catalytic performance of PZSM-5 zeolite with preformed SAPO-34 molecular sieve", Acta Petrolei Sinica (Petroleum Processing Section), Jun. 2010, vol. 26, No. 3, pp. 357-363; Research Institute of Special Chemical, Taiyuan University of Technology, Taiyuan, China.

Zhang, et al., "Characterization and catalytic performance of SAPO-11/H.beta. composite molecular sieve compared with the mechanical mixture", Microporous and Mesoporous Materials, Feb. 1, 2008, vol. 108, pp. 13-21, Science Direct, Elsevier.

Fan, et al., "Synthesis of ZSM-5/SAPO-11 composite and its application in FCC gasoline hydro-upgrading catalyst", Catalysis Today, Apr. 3, 2006, vol. 114, pp. 388-396, Science Direct, Elsevier.

"Wang, et al., ""Synthesis, characterization, and catalytic activities of mesostructured aluminophosphates assembled with preformed MFI zeolite nanoclusters"", Microporous and Mesoporous Materials, Sep. 1, 2005, vol. 83, pp. 136-144, Science Direct, Elsevier".

(Continued)

*Primary Examiner* — Melvin C Mayes
*Assistant Examiner* — Sheng H Davis
(74) *Attorney, Agent, or Firm* — Liza Negron; David M. Weisberg

(57) ABSTRACT

A process for producing an aluminosilicate molecular sieve comprises crystallizing a reaction mixture comprising water, a source of silica and seeds of a silicoaluminophosphate and/or an aluminophosphate molecular sieve. The resultant aluminosilicate molecular sieve product can advantageously be substantially free of framework phosphorus.

10 Claims, 2 Drawing Sheets

(56) References Cited

OTHER PUBLICATIONS

International Search Report with Written Opinion for PCT/US2013/067207 dated Mar. 27, 2014.

* cited by examiner

SEEDED SYNTHESIS OF ALUMINOSILICATE MOLECULAR SIEVES

CROSS-REFERENCE TO RELATED APPLICATIONS

This application is a National Stage (Sec. 371) filing of International Application No. PCT/US2013/067207, filed on Oct. 29, 2013, which claims the benefit of U.S. Provisional Application No. 61/735,152, filed on Dec. 10, 2012, the entire contents of both of which are hereby incorporated by reference.

FIELD OF THE INVENTION

This invention relates to the synthesis of crystalline aluminosilicate molecular sieves using seed crystals.

BACKGROUND OF THE INVENTION

Molecular sieve materials, both natural and synthetic, have been demonstrated in the past to be useful as adsorbents and to have catalytic properties for various types of hydrocarbon conversion reactions. Certain molecular sieves, such as zeolites, silicoaluminophosphates (SAPOs), aluminophosphates (AlPOs), and mesoporous materials, are ordered, porous crystalline materials having a definite crystalline structure as determined by X-ray diffraction (XRD). Within a crystalline molecular sieve material there are cavities which may be interconnected by channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline silicates. These silicates can be described as three-dimensional frameworks of $SiO_4$ tetrahedra and oxides of Group 13 elements (e.g., $AlO_2$) of the Periodic Table. The tetrahedra are cross-linked by the sharing of oxygen atoms with the electrovalence of the tetrahedra containing the Group 13 element (e.g., aluminum) being balanced by the inclusion in the crystal of a cation, for example a proton, an alkali metal or an alkaline earth metal cation. This can be expressed wherein the ratio of the Group 13 element (e.g., aluminum) to the number of various cations, such as $H^+$, $Ca^{2+}/2$, $Sr^{2+}/2$, $Na^+$, $K^+$, or $Li^+$, is equal to unity.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the "Atlas of Zeolite Framework Types", eds. Ch. Baerlocher, L. B. McCusker, D. H. Olson, Elsevier, Sixth Revised Edition, 2007, which is hereby incorporated by reference.

The crystallization of molecular sieves, such as aluminosilicates, is often aided by seeding. Seeding is a term commonly used to describe the effect of a minor amount of a product phase (present either through intentional addition or via cross-contamination) in assisting the crystallization of larger quantities of the same material. Seeding can be used effectively for the control of phase purity and crystal size, as well as to accelerate synthesis and reduce or obviate the need for an organic structure directing agent.

It is also known that the synthesis of a crystalline aluminosilicate of one framework type can be assisted by seeds of an aluminosilicate of a different framework type. For example, U.S. Pat. No. 7,067,108 discloses that aluminosilicates of the CHA framework type can be synthesized in the presence of seed crystals of aluminosilicates having an AEI, LEV or OFF framework-type.

In addition, International Publication No. WO 00/06493 discloses that a colloidal suspension of seeds of a molecular sieve of the LEV framework type, such as Levyne, NU-3, ZK-20, ZSM-45 and SAPO-35, can be used to manufacture phosphorus-containing molecular sieves, particularly SAPOs and AlPOs of the CHA framework type.

According to the present invention, it has now been found that the synthesis of aluminosilicate molecular sieves can be seeded with silicoaluminophosphate (SAPO) and aluminophosphate (AlPO) molecular sieves. In spite of the fact that SAPOs and AlPOs are different compositionally from aluminosilicates and SAPO and AlPO seeds do not end up in the final aluminosilicate crystals (no phosphorus incorporation), in some cases no crystalline products are formed without the SAPO or AlPO seeds. It has also been found that there can be structural specificity correlating the seed structure with that of the product aluminosilicate structure, and a clear effect of SAPO and AlPO seeds on the morphology of the aluminosilicate products. This finding is believed to be unprecedented and has the potential for the synthesis of new molecular sieve structures present as a SAPO or AlPO phase but not as a zeolite phase.

SUMMARY OF THE INVENTION

In one aspect, the invention resides in a process for producing an aluminosilicate molecular sieve, wherein the process comprises: (a) crystallizing a reaction mixture comprising water, a source of silica, and seeds of a silicoaluminophosphate and/or an aluminophosphate molecular sieve; and (b) recovering an aluminosilicate molecular sieve product substantially free of framework phosphorus.

In one embodiment, the reaction mixture comprises at least 500 wppm of said seeds, e.g., from about 1000 wppm to about 50000 wppm or from about 2000 wppm to about 25000 wppm.

Conveniently, the reaction mixture can also comprise an organic directing agent effective to direct the synthesis of said aluminosilicate molecular sieve product. The reaction mixture may additionally or alternately comprise a source of fluoride ions.

In one embodiment, the aluminosilicate molecular sieve product can include a CHA framework, and the seeds can comprise a silicoaluminophosphate molecular sieve and/or an aluminophosphate having double 6-membered rings as a structural building unit. For example, the seeds may comprise a silicoaluminophosphate and/or an aluminophosphate molecular sieve having a framework type selected from the group consisting of ERI, LEV, AFX, CHA, AEI, and mixtures and intergrowths thereof.

DETAILED DESCRIPTION OF THE EMBODIMENTS

Figure 1:
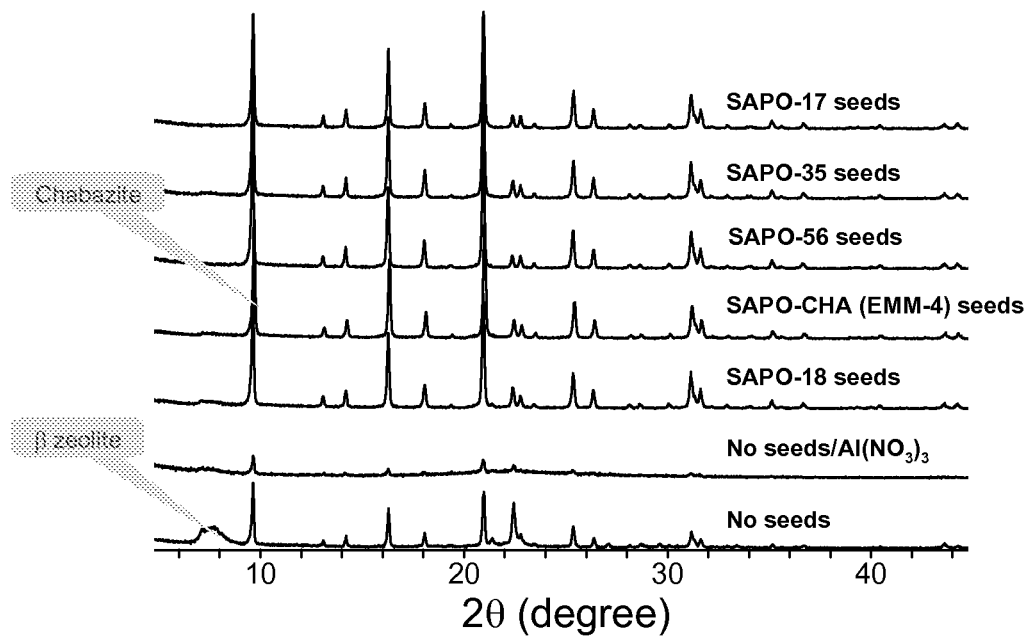
FIG. 1 compares the X-ray diffraction patterns of the products of the unseeded syntheses of Examples 1 and 2 with those obtained using the SAPO seeds of Examples 3-7.

Described herein is a process for the synthesis of crystalline aluminosilicate molecular sieves using seeds of silicoaluminophosphate (SAPO) and/or aluminophosphate (AlPO) molecular sieves. Although the mechanism of the process may not be fully understood, it has been unexpectedly found that essentially none of the phosphorus, and optionally but preferably at least part of the aluminum, from the seeds can be incorporated into the framework of the crystalline aluminosilicate product. Generally, the crystalline product can be substantially free of framework phosphorus (e.g., can contain less than 0.5 wt % framework phosphorus, less than 0.2 wt % framework phosphorus, less than 0.1 wt % framework phosphorus, less than 500 wppm framework phosphorus, less than 200 wppm framework phosphorus, less than 100 wppm framework phosphorus, or no measurable framework phosphorus).

The SAPO and/or AlPO seeds can be added to an aqueous reaction mixture comprising a source of silicon, optionally an additional source of aluminum (separate from the SAPO and/or AlPO seeds), and typically also an organic structure directing agent effective to direct the synthesis of the desired aluminosilicate molecular sieve product. In one embodiment, the reaction mixture can be substantially free of phosphorus, apart from the phosphorus contained by said seeds. As used herein, the term "substantially free of phosphorus" means that the reaction mixture can contain less than 0.5 wt % phosphorus, less than 0.2 wt % phosphorus, less than 0.1 wt % phosphorus, less than 500 wppm phosphorus, less than 200 wppm phosphorus, less than 100 wppm phosphorus, or no measurable phosphorus), except for the phosphorus from the seeds.

The amount of SAPO and/or AlPO seeds added to the reaction mixture can vary significantly, but, in one embodiment, sufficient seeds can be added so that reaction mixture can comprise at least 500 wppm of the SAPO and/or AlPO seeds, e.g., from about 1000 wppm to about 50000 wppm or from about 2000 wppm to about 25000 wppm.

In some embodiments, the reaction mixture may additionally or alternately comprise a source of fluoride ions, e.g., such that an $F^-/SiO_2$ molar ratio of the reaction mixture can be from about 0.4 to about 0.8. Typically, the pH of the reaction mixture can be less than 9, e.g., less than 8, from about 5 to about 9, or from about 5 to about 8.

Crystallization of the desired aluminosilicate molecular sieve from the seeded reaction mixture can be carried out at either static or stirred conditions in a suitable reactor vessel (e.g., polypropylene jars or Teflon™-lined or stainless steel autoclaves) at a temperature from about 80° C. to about 220° C. (e.g., from about 100° C. to about 200° C.) for a time sufficient for crystallization to occur at the temperature used (e.g., from about 0.5 days to about 100 days or from 1 day to about 20 days). Thereafter, the aluminosilicate crystals can be separated from the liquid and recovered.

While not wishing to be bound by any particular theory of operation, it is believed that the crystal structure of the SAPO and/or AlPO molecular sieve employed as the seeds in the present process can be determinative of the crystal structure of the final aluminosilicate product and/or can influence the crystal morphology of the aluminosilicate product.

Thus, in the case of a reaction mixture containing an organic directing agent effective to direct the synthesis of a CHA framework type aluminosilicate molecular sieve, it has been unexpectedly found that seeds of SAPO and/or AlPO molecular sieves having double 6-membered rings as a structural building unit can be effective in facilitating the crystallization of the desired molecular sieve and the purity of the resultant crystalline phase. Examples of such SAPO and/or AlPO molecular sieves can include those having the ERI framework type (such as SAPO-17), the LEV framework type (such as SAPO-35), the AFX framework type (such as SAPO-56), the CHA framework type (e.g., SAPOs having the CHA framework type and made with N,N-dimethylcyclohexylamine, such as EMM-4, and/or those containing fluoride, such as EMM-5), and/or the AEI framework type (such as SAPO-18).

Moreover, with regard to the morphology of the crystalline aluminosilicate product, it has been unexpectedly found that using seeds of SAPO and/or AlPO molecular sieves having only double 6-membered rings, and no single 6-membered rings, as structural building units, can cause contact twinning to appear (predominate) in the final CHA framework type product. However, when the seeding material also has single 6-membered rings as structural building units, then penetration twinning can appear (predominate) in the final CHA framework type product.

Additionally or alternately, the present invention can include one or more of the following embodiments.

Embodiment 1

A process for producing an aluminosilicate molecular sieve, wherein the process comprises: (a) crystallizing a reaction mixture comprising water, a source of silica and seeds of a silicoaluminophosphate and/or an aluminophosphate molecular sieve; and (b) recovering an aluminosilicate molecular sieve product substantially free of framework phosphorus.

Embodiment 2

The process of embodiment 1, wherein said reaction mixture comprises at least 500 wppm of said seeds, e.g., from about 1000 wppm to about 50000 wppm or from about 2000 wppm to about 25000 wppm.

Embodiment 3

The process of embodiment 1 or embodiment 2, wherein said reaction mixture is substantially free of phosphorus, apart from the phosphorus contained by said seeds.

Embodiment 4

The process of any one of the previous embodiments, wherein said reaction mixture also comprises a source of fluoride ions.

Embodiment 5

The process of any one of the previous embodiments, wherein said reaction mixture has a pH no more than 9, e.g., from about 5 to about 9.

Embodiment 6

The process of any one of the previous embodiments, wherein said reaction mixture further comprises an organic directing agent effective to direct the synthesis of said aluminosilicate molecular sieve product.

Embodiment 7

The process of any one of the previous embodiments, wherein said aluminosilicate molecular sieve product has a CHA framework, and wherein said seeds comprise a silicoaluminophosphate and/or an aluminophosphate molecular sieve having double 6-membered rings as a structural building unit.

Embodiment 8

The process of embodiment 7, wherein said seeds comprise a silicoaluminophosphate and/or an aluminophosphate molecular sieve having a framework type selected from the group consisting of ERI, LEV, AFX, CHA, AEI, and mixtures and intergrowths thereof.

The invention will now be more particularly described with reference to the following non-limiting Examples and accompanying drawings.

EXAMPLES

Example 1

A reaction mixture suitable for the synthesis of a high-silica aluminosilicate zeolite having a CHA framework type and using dimethylethylcyclohexylammonium hydroxide (DMECHA$^+$OH$^-$) as an organic structure directing agent was prepared by mixing ~58.6 grams of tetraethylorthosilicate (TEOS) and ~214 grams of an aqueous solution (~11.4 wt %) of DMECHA$^+$OH$^-$. The mixture was placed on a shaker at room temperature (~20-25° C.) for three days, to ensure complete hydrolysis of the TEOS. To the resulting solution was added ~6.75 grams of HF solution (~50 wt %), which appeared to cause immediate precipitation. The mixture was observed to have a pH of ~6. This mixture was placed on a slightly heated hot plate, to evaporate ethanol and excess water, until its weight was down to ~70 g and the following molar composition was reached (normalized to ~1.0 silica content): ~0.6 HF:~0.5 DMECHA$^+$OH$^-$:~0.002 Al$_2$O$_3$:SiO$_2$:~5 H$_2$O.

The resultant mixture was divided into 10 approximately equal ~7-gram portions. To the first ~7-gram portion, no seeds were added. The mixture was sealed inside a ~23-mL Teflon™-lined Parr autoclave. The autoclave was heated in an oven at ~150° C. for about four days before being taken out and cooled, and the solid product was isolated on a filter and washed with deionized water. The solid appeared to be a largely amorphous product containing some chabazite and zeolite beta as crystalline phases. The X-ray diffraction pattern of the product is shown in FIG. 1.

Example 2

To one of the remaining nine ~7-gram portions of the reaction mixture of Example 1 was added an aqueous solution of Al(NO$_3$)$_3$ as an aluminum source and the excess water was evaporated prior to sealing of the Parr autoclave before crystallization. The mixture had a Si/Al ratio of ~83. Again, the product appeared to be largely amorphous, with a very small amount of chabazite being discernible from the X-ray diffraction pattern (see FIG. 1). This Example was included to show that merely providing aluminum from a non-SAPO seed source did not lead to the formation of a substantial chabazite product phase.

Examples 3-7

To five of the remaining eight ~7-gram portions of the reaction mixture of Example 1 were each added 0.5 wt % of the SAPO seeds as listed in Table 1 below, and the individual mixtures were thoroughly mixed prior to crystallization.

TABLE 1

| Example | Seed | Seed Structure | Al, % | Si, % | Si/Al Ratio |
|---|---|---|---|---|---|
| 3 | SAPO-17 | ERI | 0.441 | 33.7 | 73.4 |
| 4 | SAPO-35 | LEV | 0.455 | 34.4 | 72.6 |
| 5 | SAPO-56 | AFX | — | — | — |
| 6 | EMM-4 | CHA | 0.511 | 34.6 | 65.0 |
| 7 | SAPO-18 | AEI | 0.537 | 34.5 | 62.2 |

The X-ray diffraction patterns of the products are shown in FIG. 1, and in each case appeared to demonstrate a highly crystalline product composed predominantly of a CHA framework type aluminosilicate. No phosphorus was observed in the products. The Al and Si contents, as well as the Si/Al ratio, of the reaction mixtures are also listed in Table 1.

Examples 8-10

To the remaining three ~7-gram portions of the reaction mixture of Example 1 were each added ~0.5 wt % of the SAPO seeds as listed in Table 2 below, and the individual mixtures were thoroughly mixed prior to crystallization.

TABLE 2

| Example | Seed | Seed Structure |
|---|---|---|
| 8 | EMM-8 | SFO |
| 9 | SAPO-11 | AEL |
| 10 | SAPO-5 | AFI |

Figure 2:
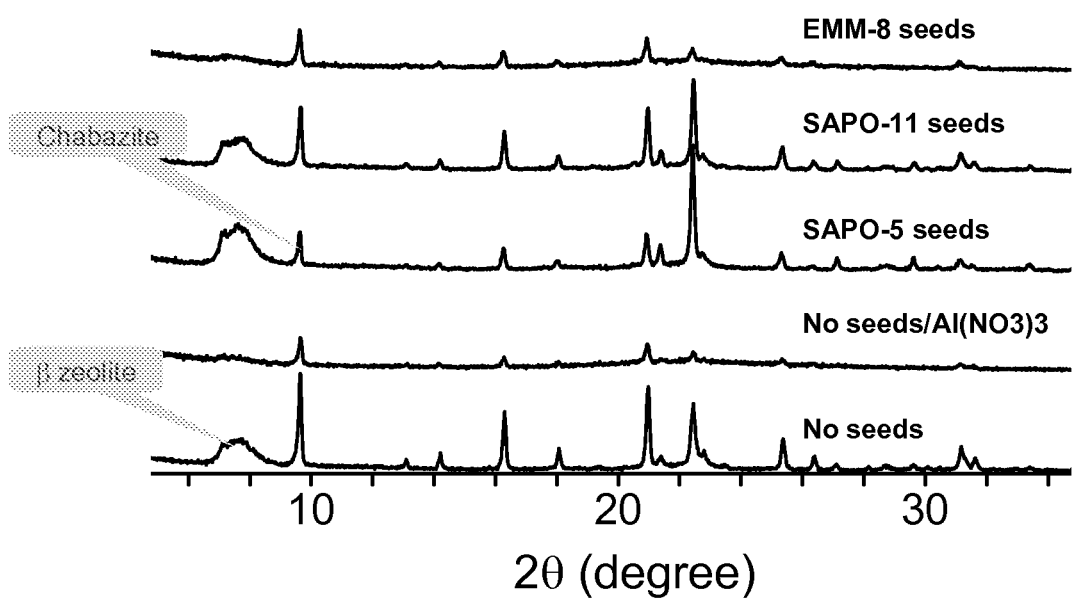
FIG. 2 compares the X-ray diffraction patterns of the products of the unseeded syntheses of Examples 1 and 2 with those obtained using the SAPO seeds of Examples 8-10.
Figure 3:
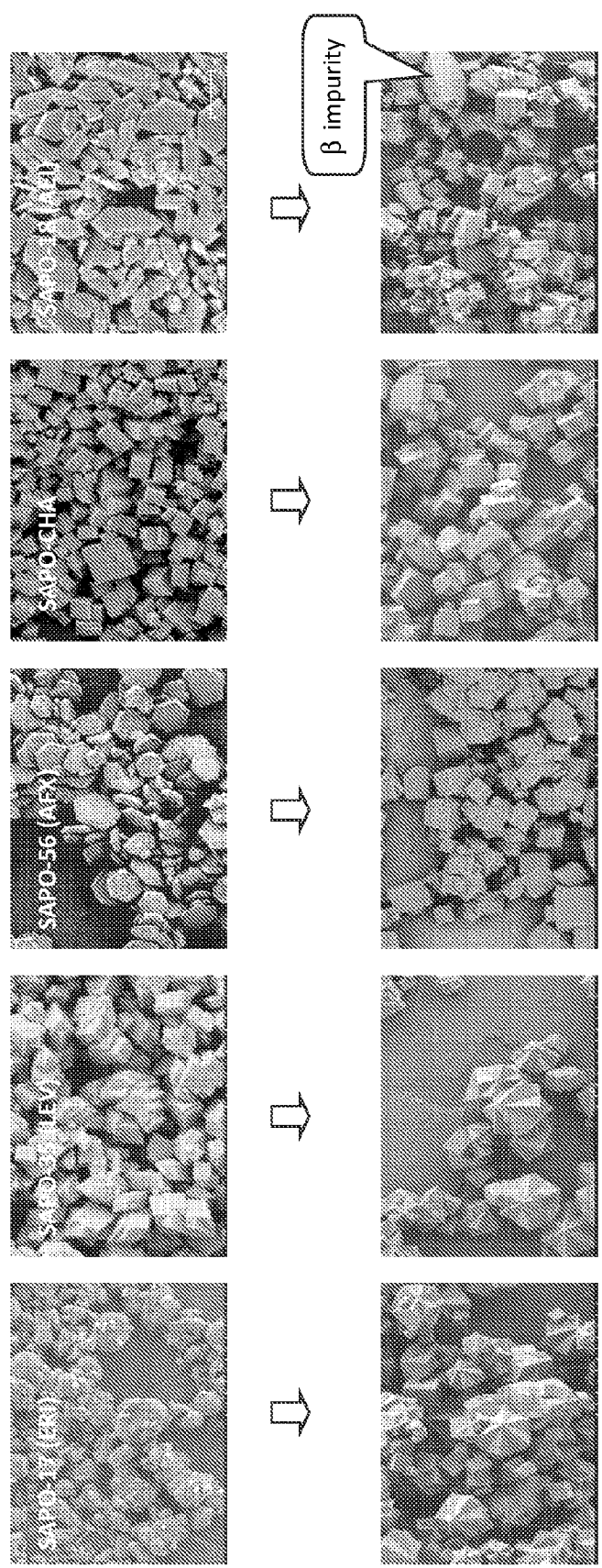
FIG. 3 compares the Scanning Electron Microscopy images of various types of SAPO seeds (top) and their corresponding chabazite products (Examples 3-7, bottom).

The X-ray diffraction patterns of the products are shown in FIG. 2, and in each case appeared to demonstrate a largely amorphous product with some minority chabazite and zeolite beta phases present.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of the patentable novelty which reside in the present disclosure, including all features which would be treated as equivalents thereof by those skilled in the art to which the disclosure pertains.

The invention claimed is:

1. A process for producing an aluminosilicate molecular sieve, wherein the process comprises:
   (a) crystallizing a reaction mixture comprising water, a source of silica and seeds of a silicoaluminophosphate and/or an aluminophosphate molecular sieve having a framework type selected from the group consisting of ERI, LEV, AFX, CHA, AEI, and mixtures and intergrowths thereof and being; and (b) recovering an aluminosilicate molecular sieve substantially free of framework phosphorus.

2. The process of claim 1, wherein said reaction mixture comprises at least 500 wppm of said seeds.

3. The process of claim 1, wherein said reaction mixture is substantially free of phosphorus, apart from the phosphorus contained by said seeds.

4. The process of claim 1, wherein said reaction mixture also comprises a source of fluoride ions.

5. The process of claim 1, wherein said reaction mixture has a pH no more than 9.

6. The process of claim 1, wherein said reaction mixture further comprises an organic directing agent effective to direct the synthesis of said aluminosilicate molecular sieve product.

7. The process of claim 1, wherein said seeds comprise of a silicoaluminophosphate and/or an aluminophosphate molecular sieve have double 6-membered rings as a structural building unit.

8. The process of claim 2, wherein said reaction mixture comprises from about 1000 wppm to about 50000 wppm of said seeds.

9. The process of claim 2, wherein said synthesis mixture comprises from about 2000 wppm to about 25000 wppm of said seeds.

10. The process of claim 5, wherein said reaction mixture has a pH from about 5 to about 9.

* * * * *